United States Patent [19]
Saito et al.

[11] Patent Number: 5,995,837
[45] Date of Patent: *Nov. 30, 1999

[54] MOBILE COMMUNICATION SYSTEM

[75] Inventors: Yukichi Saito, Higashiyamato; Yasuo Maruyama, Yokohama; Masami Yabusaki, Iruma, all of Japan

[73] Assignee: NTT Mobile Communications Network Inc., Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/601,044
[22] PCT Filed: Oct. 3, 1995
[86] PCT No.: PCT/JP95/02012
  § 371 Date: Aug. 2, 1996
  § 102(e) Date: Aug. 2, 1996
[87] PCT Pub. No.: WO96/10894
  PCT Pub. Date: Apr. 11, 1996

[30] Foreign Application Priority Data

Oct. 4, 1994 [JP] Japan ................................ 6-240367

[51] Int. Cl.⁶ .................................................. H04Q 7/20
[52] U.S. Cl. .......................... 455/439; 455/440; 455/445; 455/432; 455/436
[58] Field of Search .................................... 455/422, 432, 455/436, 450, 428, 445, 437, 438, 439

[56] References Cited

U.S. PATENT DOCUMENTS 5,117,502  5/1992  Onoda et al. ............................ 455/436
5,454,026  9/1995  Tanaka ..................................... 455/437
5,457,680  10/1995 Kamm et al. ............................ 455/432

FOREIGN PATENT DOCUMENTS 0 421 535  4/1991  European Pat. Off. .
3-6931     1/1991  Japan .

Primary Examiner—Dwayne D. Bost
Assistant Examiner—Tracy M. Legree
Attorney, Agent, or Firm—Brinks Hofer Gilson & Lione

[57] ABSTRACT

A handover control is executed when a location area of the mobile station is changed. The communication channel applied is the optimum route suited for the roaming destination of the mobile station. A service controller 6 is provided in the mobile communication network, switching node information transmitters 7 are provided in switching nodes 151, 131 and 132 so as to transmit, to the service controller 6, switching node informations representing the nodes themselves. Furthermore, in the service controller 6, a memory 8 for storing the switching node informations, and a handover execution unit 9 for executing handover control are provided. When a fixed terminal 5 in an external network and the mobile station 1 are in communication, and the location area of the mobile station 1 is to changed due to roaming, the handover execution unit 9 specifies, on the basis of contents of the switching node information memory 8, the gateway conducting & switching node 151 to be the node utilized for the communication channel. Then, the unit 9 issues an instruction to assign a channel from the gateway conducting & switching node 151 to the subscriber switching node 132 in the location area which is the roaming destination.

15 Claims, 10 Drawing Sheets

EXAMPLE OF CONFIGURATION OF MOBILE COMMUNICATION NETWORK IN CONVENTIONAL SYSTEM

EXAMPLE OF CHANNEL CONNECTION WHEN HANDOVER TAKES PLACE IN CONVENTIONAL SYSTEM

MOBILE COMMUNICATION SYSTEM

TECHNICAL FIELD

The present invention relates to a mobile communication system, and especially to handover control functions for changing channel assignment of a mobile station when the mobile station roams from a current location area to another location area.

BACKGROUND ART

It is generally known that, in a mobile communication system, each mobile station communicates with others via a subscriber switching node of a current location area. When the mobile station roams from the current location area to another area, the communication channel passing through the subscriber switching node in the current location area should be changed over to another communication channel passing through a subscriber switching node in the location area which is the roaming destination. The change of communication channels is executed by so-called handover control. The handover control adopted for conventional mobile communication systems will be described below.

FIG. 9 shows an example configuration of a mobile communication network in which a fixed terminal 5 and a mobile station 1 communicate with each other. In FIG. 9, all the nodes in the fixed network side are omitted with exception of the fixed terminal. The fixed network and the mobile communication network are connected via a POI(i.e., point of interconnection) in the way of the interface point. A gateway conducting & switching node 51, being connected with other networks via the POI 4, is further connected with subordinate conducting & switching nodes 41 and 42. The conducting & switching node 41 is further connected with a subscriber switching node 31 controlling a location area 21. The conducting & switching node 42 is further connected with a subscriber switching node 32 controlling another location area 22.

The nodes 31, 32, 41, 42 and 51 and the POI 4 are previously appended with identifications so called routing numbers RN. The routing numbers are assumed to be RN1 to RN6. Furthermore, the nodes and the POI 4 are connected via channels 61 to 66. The nodes 31, 32, 41, 42 and 51 and the POI 4 stores routing tables, respectively, as shown in following Table-1.

TABLE 1

| | | Routing tables | | | |
|---|---|---|---|---|---|
| node 31 | node 32 | node 41 | node 42 | node 51 | POI 4 |
| RN1: — | RN1: 62 | RN1: 61 | RN1: 64 | RN1: 63 | RN1: 66 |
| RN2: 61 | RN2: — | RN2: 64 | RN2: 62 | RN2: 65 | RN2: 66 |
| RN3: 61 | RN3: 62 | RN3: — | RN3: 64 | RN3: 63 | RN3: 66 |
| RN4: 61 | RN4: 62 | RN4: 64 | RN4: — | RN4: 65 | RN4: 66 |
| RN5: 61 | RN5: 62 | RN5: 63 | RN5: 65 | RN5: — | RN5: 66 |
| RN6: 61 | RN6: 62 | RN6: 63 | RN6: 66 | RN6: 66 | RN6: — |

The routing tables in Table-1 show the correspondence between nodes in the routing destinations and the channels to be selected. The uses of the tables will be described more specifically. First, if a call connection request for the fixed terminal 5 is originated from the mobile station 1, the call connection request is judged, in the subscriber switching node 31, to be forwarded to the POI 4. Consequently, in the subscriber switching node 31, the line "RN6" in the corresponding routing table is referred. The numeral "61" is stored there, so that the call connection request is further forwarded to the conducting & switching node 41 via the channel 61.

Then, in the conducting & switching node 41, the line "RN6" in the routing table stored in the node 41 is referred. The numeral "63" is stored there, so that the call connection request is further forwarded to the gateway conducting & switching node 51 via the channel 63. Similarly, the line "RN6" is referred in the gateway conducting & switching node 51. The numeral "66" is stored there, so that the call connection request is forwarded via the channel 66. As such, the call connection request originated from mobile station 1 is forwarded to the POI 4 via the channels 61, 63 and 66. Then, if the fixed terminal 5 is in communicatable condition, call set up and communication are executed between the mobile station 1 and the fixed terminal 5.

FIG. 10 shows an example of channel connection, executed by the handover control, between switching nodes in the mobile communication network. In FIG. 10, it is assumed that the mobile station 1 roams from the location area 21 to the adjacent location area 22, so that a handover control is required in order to change the subscriber switching node for controlling the mobile station. In this case, the subscriber switching node 31 controlling the location area 21 specifies, by means of conventional processes, a subscriber switching node (e.g. the subscriber switching node 32 in FIG. 10) which controls the location area 22 which is the handover destination.

Then, the subscriber switching node 31 keeps the connection of channel from the gateway conducting & switching node 51 to subscriber switching node 31, namely, the channel 63 between the gateway conducting & switching node 51 and conducting & switching node 41 and the channel 61 between the conducting & switching node 41 and the subscriber switching node 31, while setting up a channel from the subscriber switching node 31 to the subscriber switching node 32 which is the handover destination. Then, when the channel assignment is completed, the channels toward the subscriber switching node 32, namely, the channel 61 between the subscriber switching node 31 and the conducting & switching node 41, the channel 64 between the conducting & switching node 41 and the conducting & switching node 42, and the channel 62 between the conducting & switching node 42 and the subscriber switching node 32 are connected. The handover control described above enables the mobile station 1 to communicate via the subscriber switching node 32 of the location area 22 which is the roaming destination.

As described above, in the conventional mobile communication system, when the handover control due to the roaming of mobile station 1 is executed, the channel from the gateway conducting & switching node to the subscriber switching node (the channel between the switching nodes 51 & 41 and the channel between the switching nodes 41 & 31 in the example of FIG. 10) is left connected, while a routing is executed from the subscriber switching node in which the handover originated to the subscriber switching node in the location area which is the roaming destination. Therefore, in view of the entire mobile communication network, application of the conventional technique is problematical, to the mobile station 1, an inefficient channel passing through the subscriber switching node 31, even though the channel being the optimum route, the route consists of the channel between the switching nodes 51 & 42 and the channel between the switching node 42 & 32, is existing. Furthermore, in addition to the circumstance described above, the handover control may be executed if mobile stations communicate with each other in a common mobile communication network and if the location area of either one is changed due to roaming. In this case, a problem quite similar to above will occur by the handover control.

DISCLOSURE OF INVENTION

It is accordingly, an object of the present invention to provide a mobile communication system for applying an optimum route, the route suited for the location of the mobile station, as the communication channel for the roamed mobile station.

The present invention provides a service controller in the mobile communication network, and provides switching node information transmitters for transmitting, to the service controller, switching node informations representing the switching nodes themselves. The service controller includes a switching node information memory for storing the switching node informations which are transmitted by the switching node information transmitters, and a handover execution unit for executing handover control on the basis of the contents of the switching node information memory. By using such a configuration, the present invention provides a solution to the above described problem.

According to a first aspect of the present invention, there is provided a mobile communication system which includes, a first node for controlling a first location area in which a mobile station can be located, a second node for controlling a second location area in which the mobile station can be located, a third node, a plurality of conducting & switching nodes for conducting the first to third nodes, and a handover controller for changing a condition of a communication channel assigned for the mobile station if the mobile station roams between the first and second location areas, the improvement comprising:

- a first switching node information transmitter for transmitting, when the third node and the mobile station are connected to each other via the first node, a switching node information representing the first node;
- a second switching node information transmitter for transmitting, when the third node and the mobile station are connected to each other via the second node, another switching node information representing the second node;
- a switching node information memory for storing either of switching node information supplied thereto; and
- a handover control unit for commanding, on the basis of the switching node information stored in the switching node information memory, a handover so as to assign a channel which connects the third node with either first or the second nodes and not with one another;
- whereby a channel which connects the second node and the third node and which does not pass through the first node is assigned.

According to a second aspect of the present invention, there is provided a method for handover utilized for a mobile communication system which includes, a first node for controlling a first location area in which a mobile station can be located, a second node for controlling a second location area in which the mobile station can be located, a third node, a plurality of conducting & switching nodes for conducting the first to third nodes, and a handover controller for changing a condition of a communication channel assigned for the mobile station if the mobile station roams between the first and second location areas, the improvement comprising the steps of:

- locating the mobile station in the first location area;
- assigning a first channel, between the mobile station and the third node, which passes through the first node and does not pass through the second node;
- leaving the mobile station roaming into the second location area;
- transmitting a switching node information representing the second node;
- storing the switching node information into the switching node information memory;
- assigning, on the basis of the switching node information stored in the switching node information memory, a second channel, between the mobile station and the third node, which passes through the second node and does not pass through the first node; and
- releasing the first channel.

The third node is preferably embodied by a gateway conducting & switching node for communicating with an external network, or a subscriber switching node similar to first and second subscriber switching nodes.

According to the former embodiment, a terminal in the external network and the mobile station in the mobile communication network communicates with each other. When the location area of the mobile station is changed due to roaming of the mobile station, a channel assignment starting from the gateway conducting & switching node which is an interface of the external network can be executed.

According to the latter embodiment, the mobile stations in a common mobile communication network communicate with each other. When a location area of either mobile station is changed due to roaming, a channel assignment is executed from the subscriber switching node of the location area of another mobile station to the subscriber switching node of the location area which is the roaming destination of the roamed mobile station.

As such, according to the present invention, since the optimum route in the mobile communication network is selected for the channel concerning the handover destination, the redundant channels between the subscriber switching node and conducting & switching node and between the plurality of conducting & switching nodes, which are required for the conventional handover, can be eliminated.

BEST MODE FOR CARRYING OUT THE INVENTION

Figure 1:
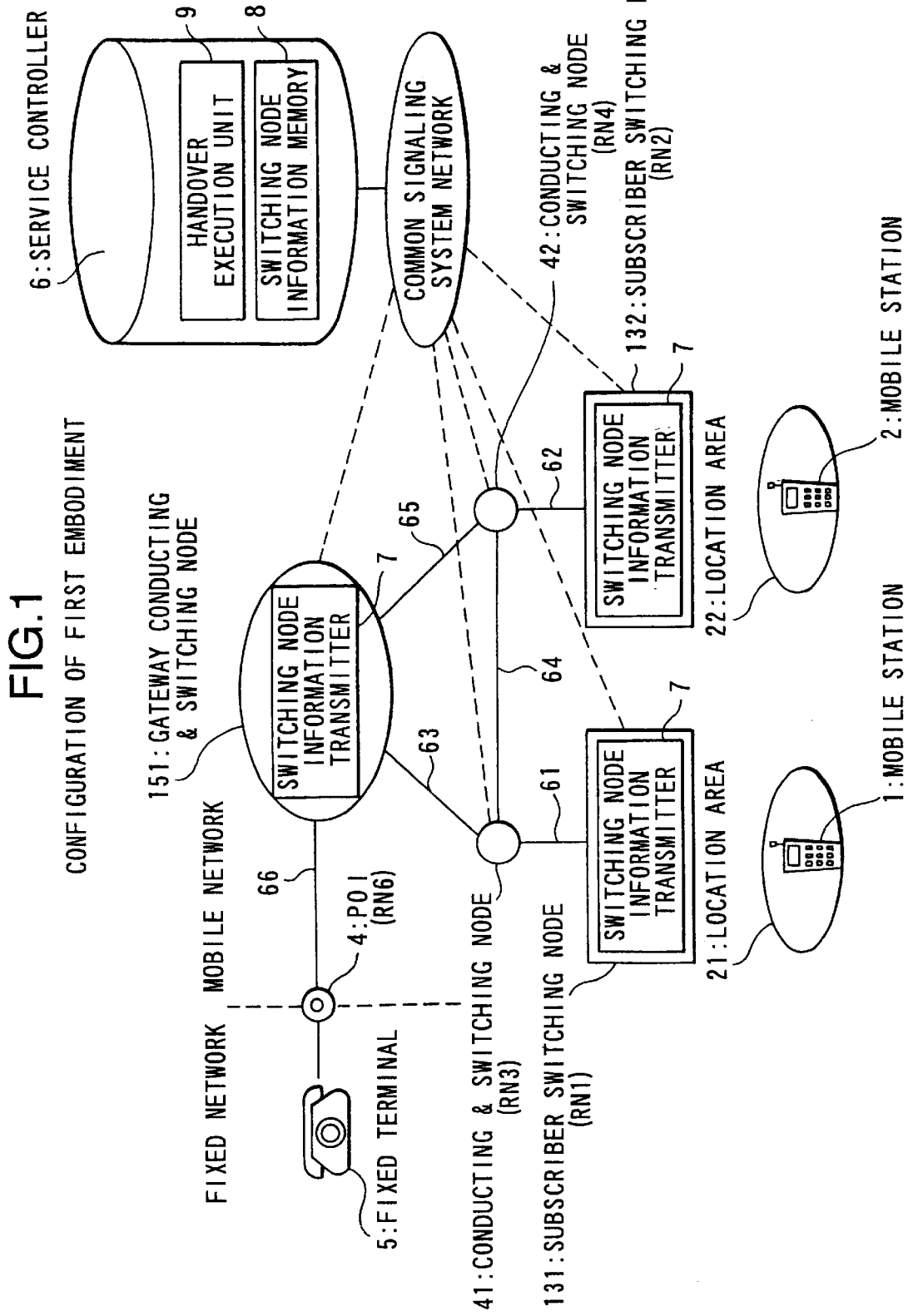
FIG. 1 shows a configuration of the mobile communication system according to a first embodiment of the present invention.

Referring to the drawings, the preferred embodiments of the present invention will be described.

<First embodiment>

Figure 9:
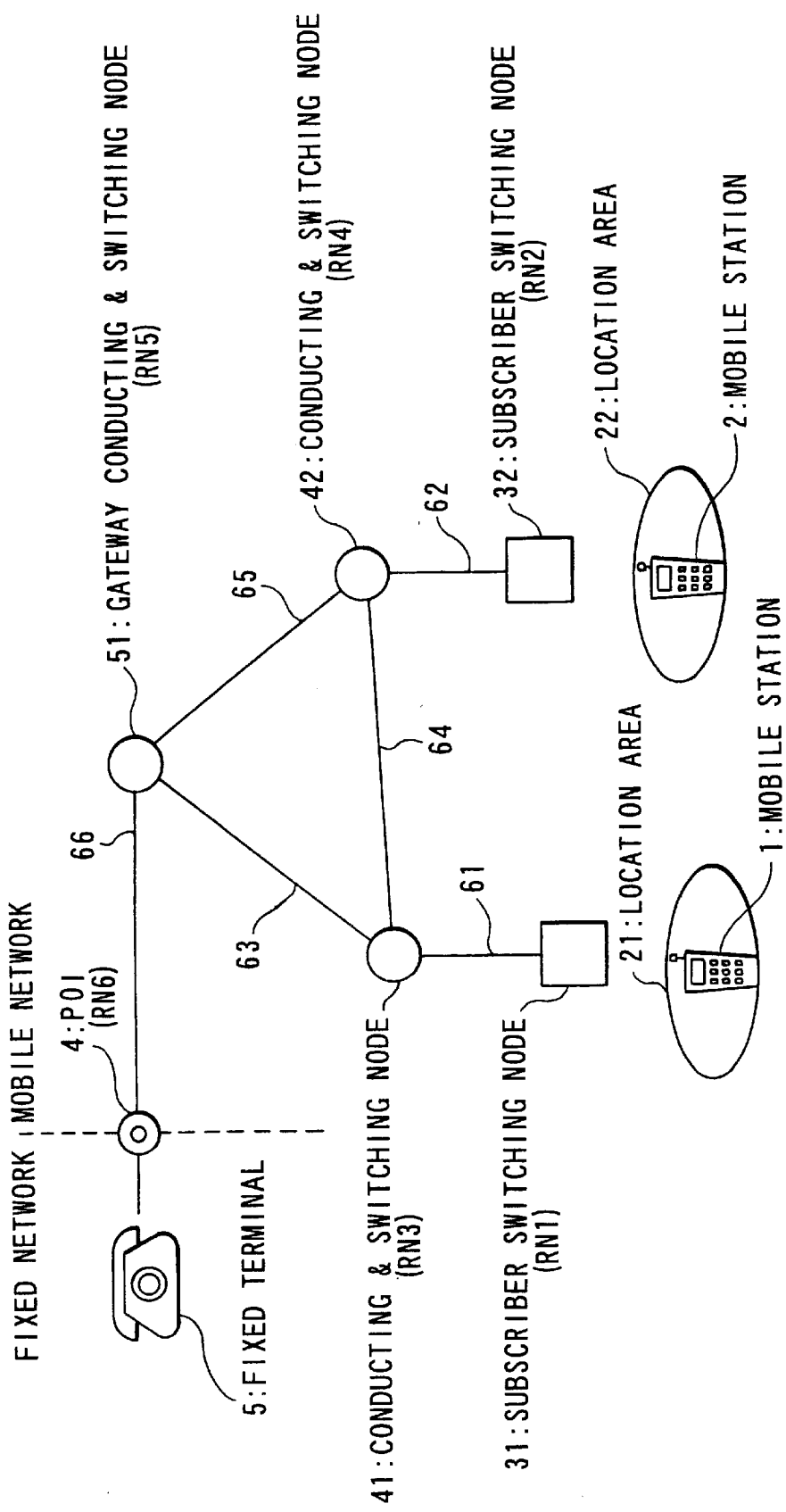
FIG. 9 shows a configuration of a conventional mobile communication system.
Figure 10:
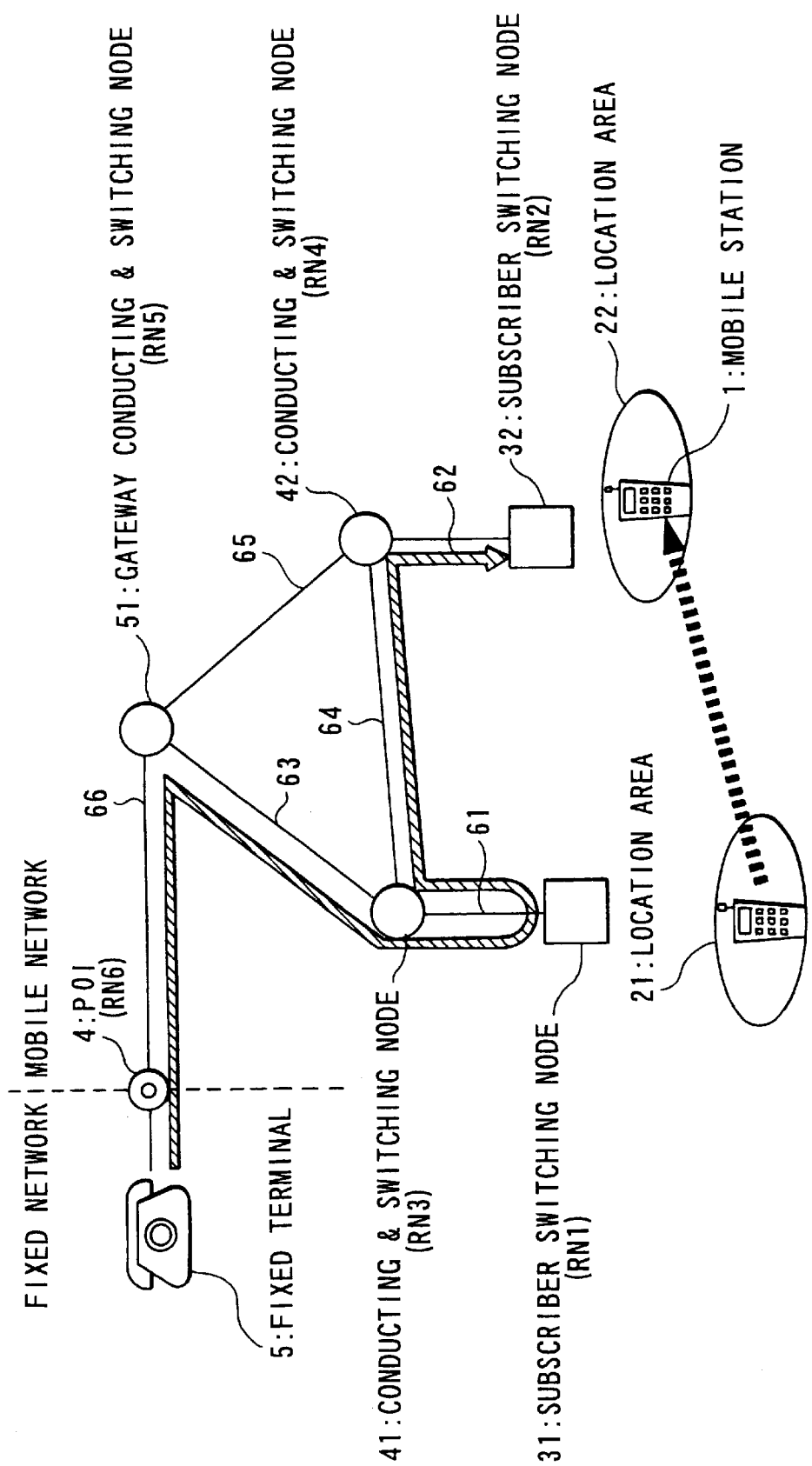
FIG. 10 shows an example of channel connection of the conventional mobile communication system when the handover takes place.

FIG. 1 shows a configuration of the mobile communication system according to a first embodiment of the present invention. In FIG. 1, components corresponding to those in FIG. 9 are attached with the same symbols. In the first embodiment, subscriber switching nodes 131 & 132 and a gateway conducting & switching node 151 are provided in place of the subscriber switching nodes 31 & 32 and the gateway conducting & switching node 51. In the gateway conducting & switching node 151 and the subscriber switching nodes 131 & 132, there are provided switching node information transmitters 7, respectively. Furthermore, in the first embodiment, a service controller 6, a controller having a switching node information memory 8 and a handover execution unit 9, is provided. The service controller 6 is connected, via a common signaling system network, with other switching nodes.

The switching node information transmitter 7 provided with each switching node is equipped with a device for informing, to the service controller 6, a switching node information which is an identification representing the pertinent switching node. The switching node information memory 8 in the service controller 6 stores the switching node informations from the respective switching nodes. The handover execution unit 9 utilizes the switching node information stored in the switching node information memory 8 so as to execute controls, such as channel re-settings, when the handover request takes place.

Figure 2:
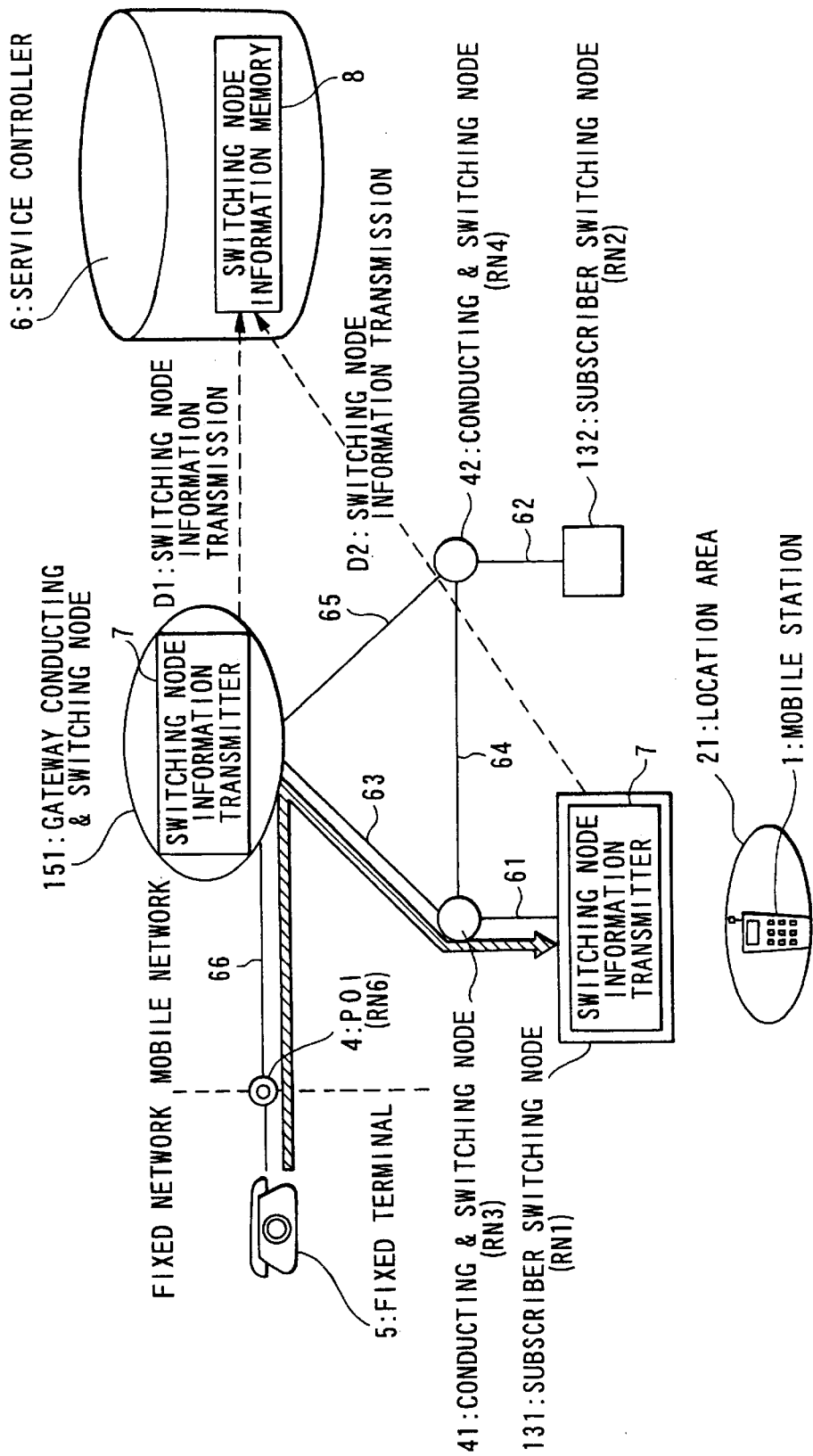
FIG. 2 shows an example of channel connection at the beginning of the communication according to the first embodiment.
Figure 4:
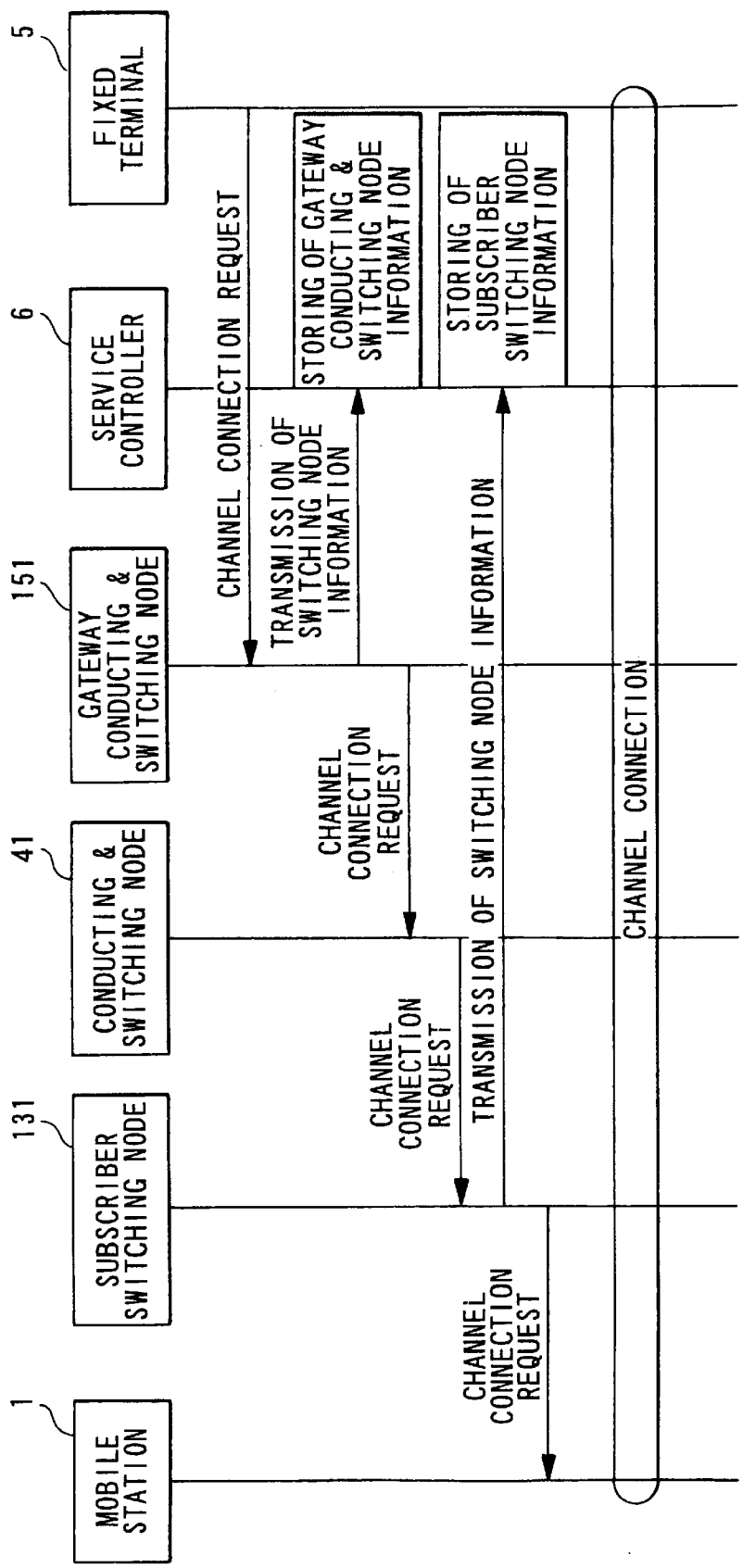
FIG. 4 shows a sequence diagram of an operation sequence of the first embodiment at the beginning of the communication.

FIG. 2 shows an example of channel connection at the beginning of the communication according to the first embodiment. In FIG. 2, handover execution unit 9 and the common signaling system network between the switching nodes and the service controller, which do not work at the beginning of the communication, are not shown. FIG. 4 shows a sequence diagram of an operation sequence at the beginning of the communication in the first embodiment. Referring to the drawings, an example of operation of this embodiment at the beginning of the communication, namely, an example of operation in the case where a call from the fixed network terminates the mobile station 1, will be described.

First, in FIG. 2, a call connection request which originates in the fixed terminal 5 is transferred to the gateway conducting & switching node 151 via the POI 4. Then, the gateway conducting & switching node 151 transfers, to the service controller 6, a switching node information D1 representing the node 151 itself by means of the switching node information transmitter 7 Then, the service controller 6 stores the received switching node information in the switching node information memory 8.

Furthermore, when the call connection request is transferred, via the informed conducting & switching node 41, to the subscriber switching node 131, the subscriber switching node 131 transfers, to the service controller 6, a switching node information D2 representing the node 131 itself by means of the switching node information transmitter 7. Then, the service controller 6 stores the received switching node information into the switching node information memory 8. Then, a channel passing through the switching nodes 151, 41 and 131 is assigned between the fixed terminal 5 and the mobile station 1 by means of conventional processes.

As described above, accompanied wit h beginning of the communication, a combination of switching node informations of the gateway conducting & switching node and the subscriber switching node, the nodes which are on the channel assigned between the fixed terminal 5 and the mobile station 1 at the beginning of the communication and which are the gateway conducting & switching node 151 and the subscriber switching node 131 in the example described above, will be stored in the switching node information memory 8.

Figure 3:
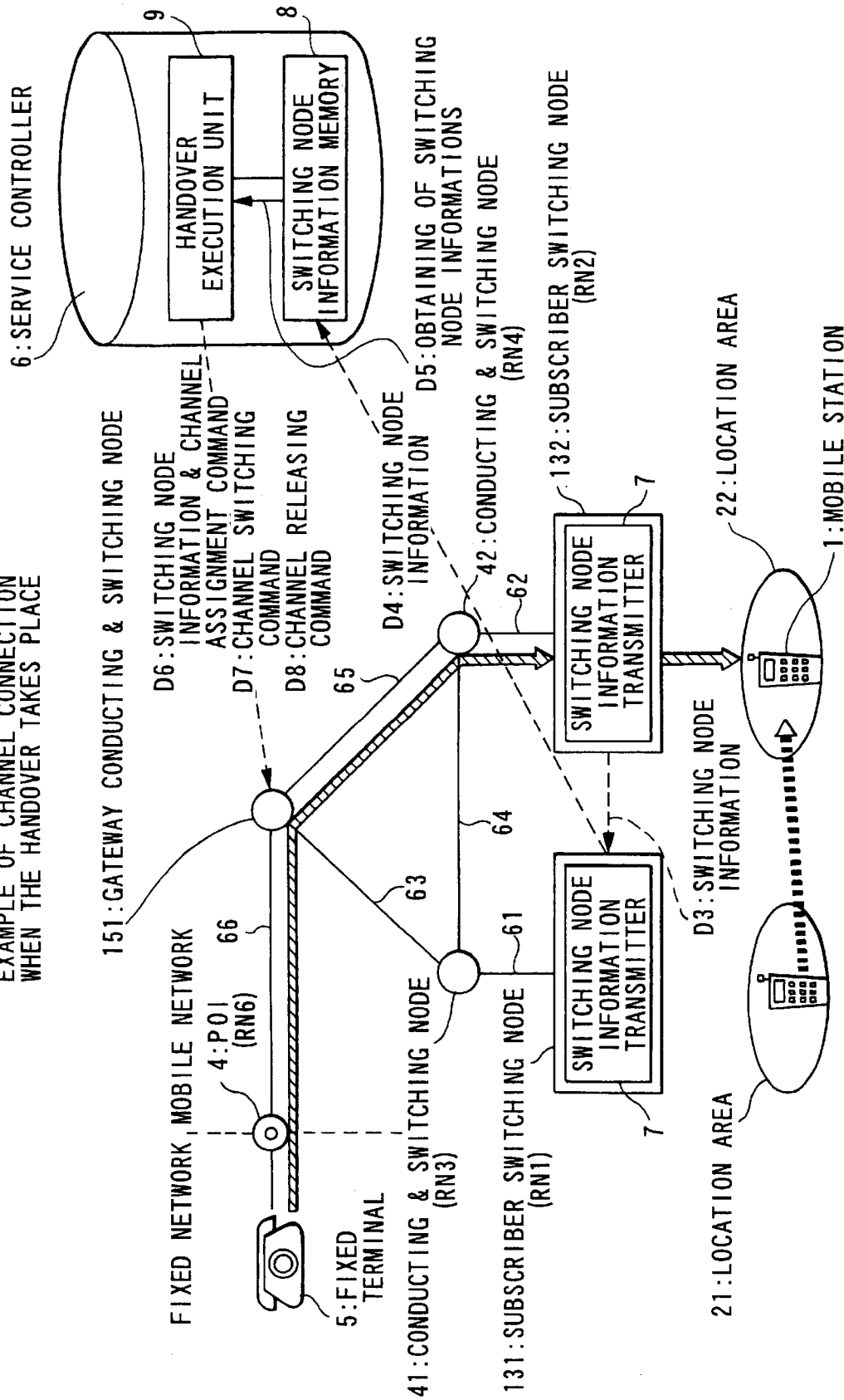
FIG. 3 shows an example of channel connection according to the first embodiment when the handover takes place.
Figure 5:
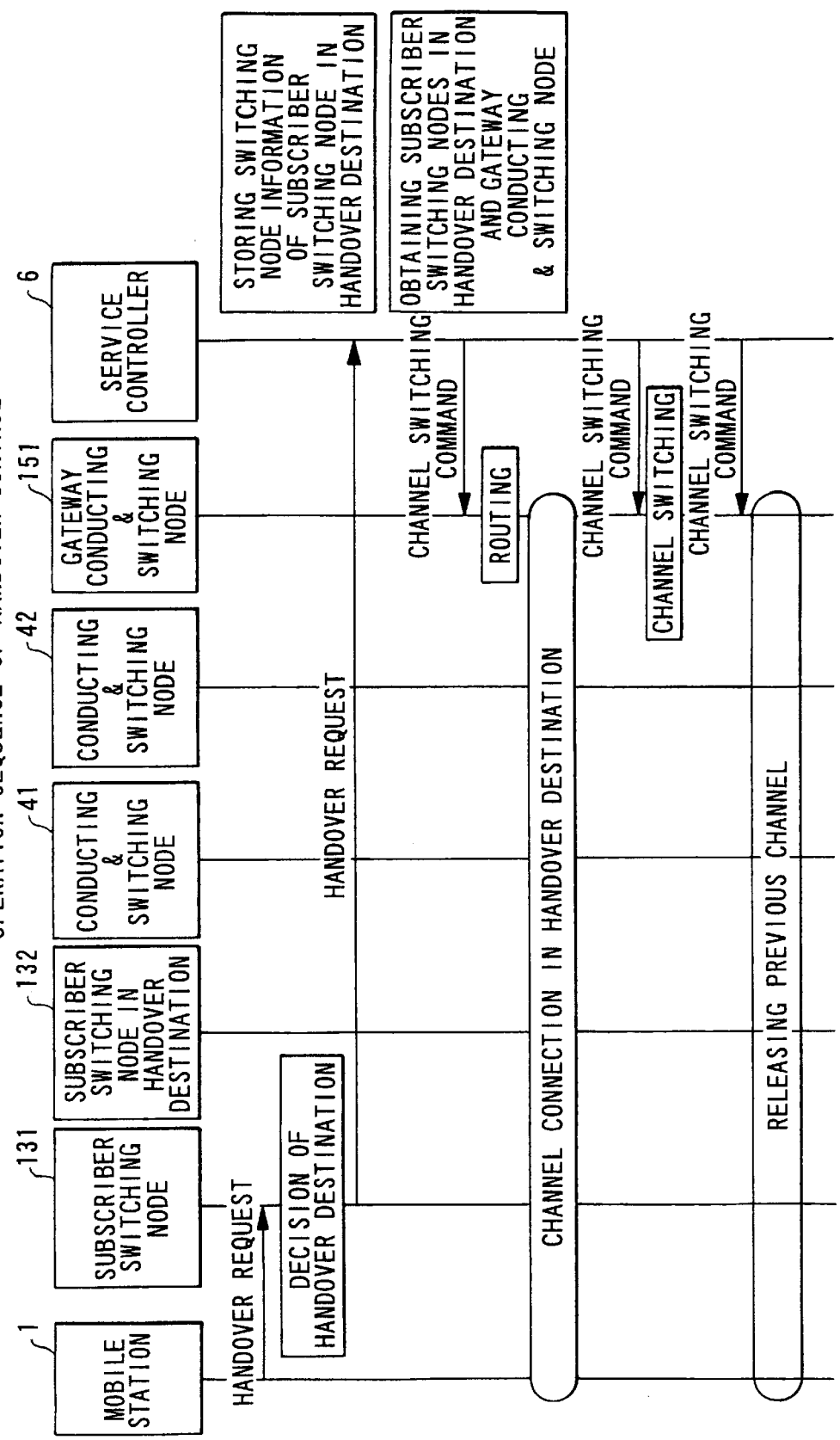
FIG. 5 shows a sequence diagram of an operation sequence of the handover control according to the first embodiment.

FIG. 3 shows an example of channel connection system in the handover destination when the handover control according to the first embodiment takes place. In FIG. 3, components which do not work when the handover takes place and the common signaling system network between the switching nodes and the service controller are not shown. FIG. 5 shows a sequence diagram of an operation sequence when the handover takes place. Referring the drawings, an example of handover operation according to the first embodiment will be described.

In FIG. 3, when the mobile station 1 roams from the location area 21 to another location area 22, a handover request is transferred from the mobile station 1 to the subscriber switching node 131. As a result, the subscriber switching node 131 determines the location area 22 which is the roaming destination and a subscriber switching node 132 for controlling the location area 22 by means of conventional processes, and obtains a switching node information D3 thereof.

Then, the subscriber switching node 131 transmits, to the service controller 6 by means of the switching node information transmitter 7, the handover request including switching node informations D4 of the node 131 itself and of the subscriber switching node 132 which is the switching destination.

The handover request is transferred to the handover execution unit 9 in the service controller 6. Then, the handover execution unit 9 searches, among the combination of switching node informations stored in the switching node information memory 8, the combination including the switching node information (the switching node information concerning the subscriber switching node 131 in this example) which is representing the node handover request originated and is included in the handover request. According to the example described above, a combination D5, of switching node informations of the gateway conducting & switching node 151 and the subscriber switching node 131, is obtained as a searched result.

Then, the service controller 6 transmits, to the gateway conducting & switching node 151 in the combination obtained by the searching, a channel assignment command D6 which makes, the subscriber switching node 132 which is the switching destination in the handover request, into the connection destination. Furthermore, the service controller 6 stores a combined information, the information consists of switching node information of the subscriber switching node 132 in the switching destination and the switching node information of gateway conducting & switching node 151, as a revised information concerning the call by means of the switching node information memory 8.

Then, the gateway conducting & switching node 151 which has received the command for channel assignment executes, by means of conventional routing technique, a channel assignment on the basis of the switching node information included in the command for channel assignment. Then, the node 151 executes channel assignment toward the subscriber switching node 132 of the handover destination. When the new channel assignment is completed, the handover execution unit 9 transmits, to the gateway conducting & switching node 151, a command D7 for switching from the previous channel assigned at the beginning of the communication to the channel newly assigned channel, and another command D8 for releasing the previous channel. As a result, the gateway conducting & switching node 151 executes a changeover into the newly assigned channel and releases the previous channel.

<Second embodiment>

Figure 6:
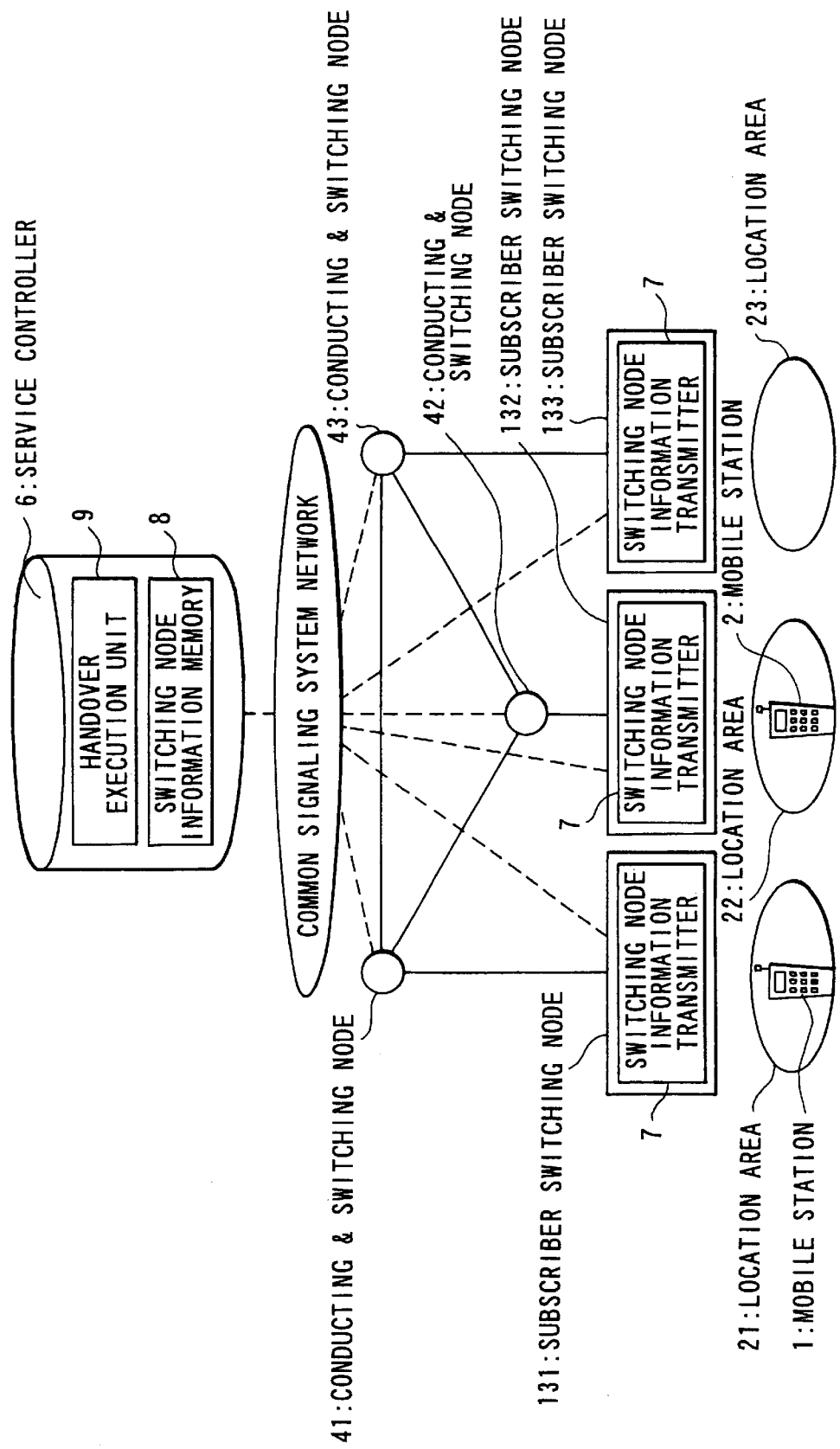
FIG. 6 shows a configuration of the mobile communication system according to a second embodiment of the present invention.

In the first embodiment, communication between the fixed terminal and the mobile station was described as an example for the mobile communication network and other networks. However, the present invention is applicable even for the handover control of the communication between the mobile stations within the mobile communication network. FIG. 6 shows an example of configuration of the mobile communication network in such a situation. In FIG. 6, subscriber switching nodes 131, 132 and 133 for controlling the location areas 21, 22 and 23, respectively, are connected with conducting & switching nodes 41, 42 and 43 for conducting a plurality of switching nodes. The conducting & switching nodes 41, 42 and 43 are connected to each other. As similar to the first embodiment, the switching nodes are connected with the service controller 6 via the common signaling system network. Furthermore, in the second embodiment, the subscriber switching nodes 131, 132, and 133 are provided with switching node information transmitters 7, respectively. The service controller 6 is provided with the switching node information memory 8 and the handover execution unit 9.

Figure 7:
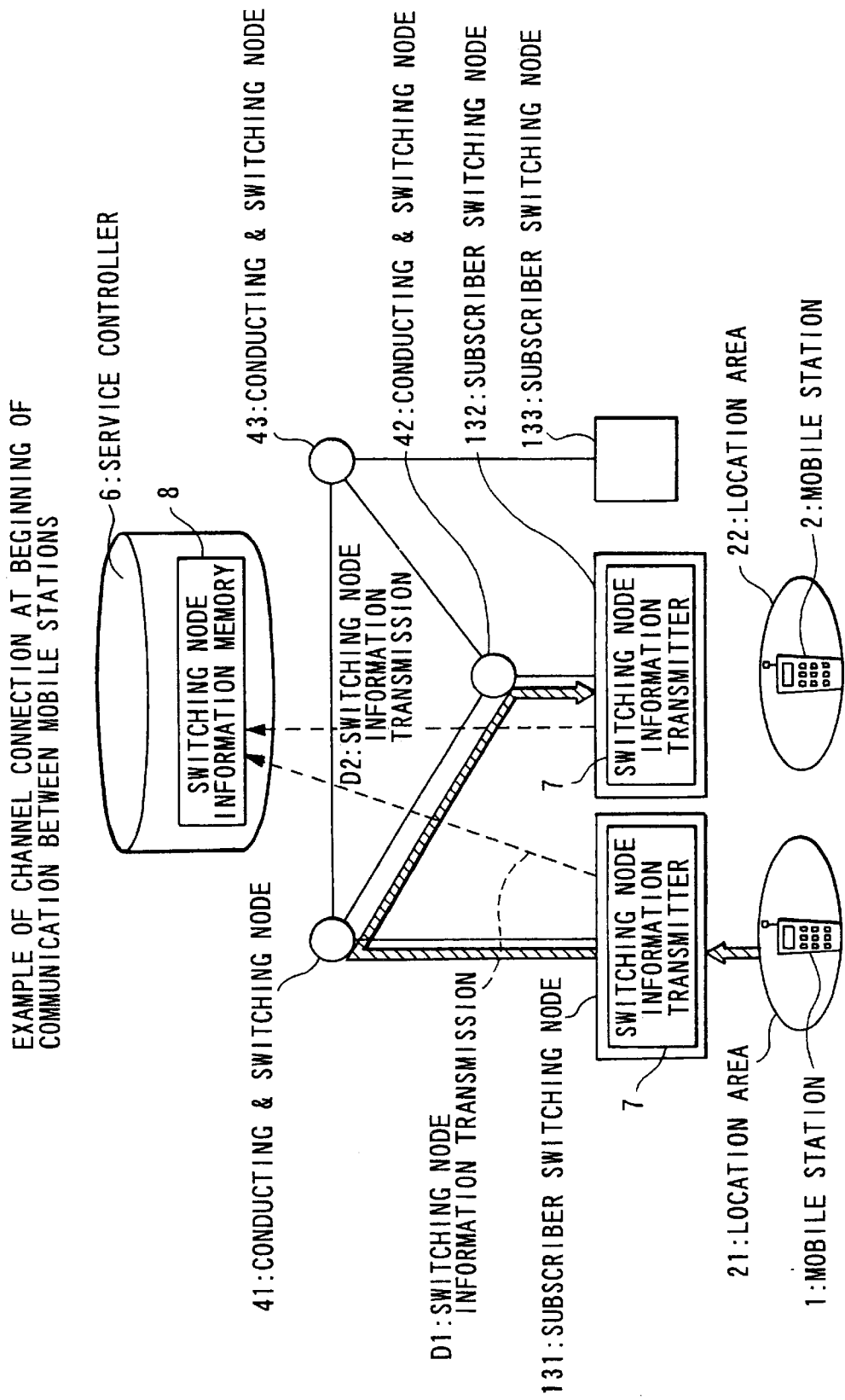
FIG. 7 shows an example of channel connection at the beginning of the communication between the mobile stations according to the second embodiment.
Figure 8:
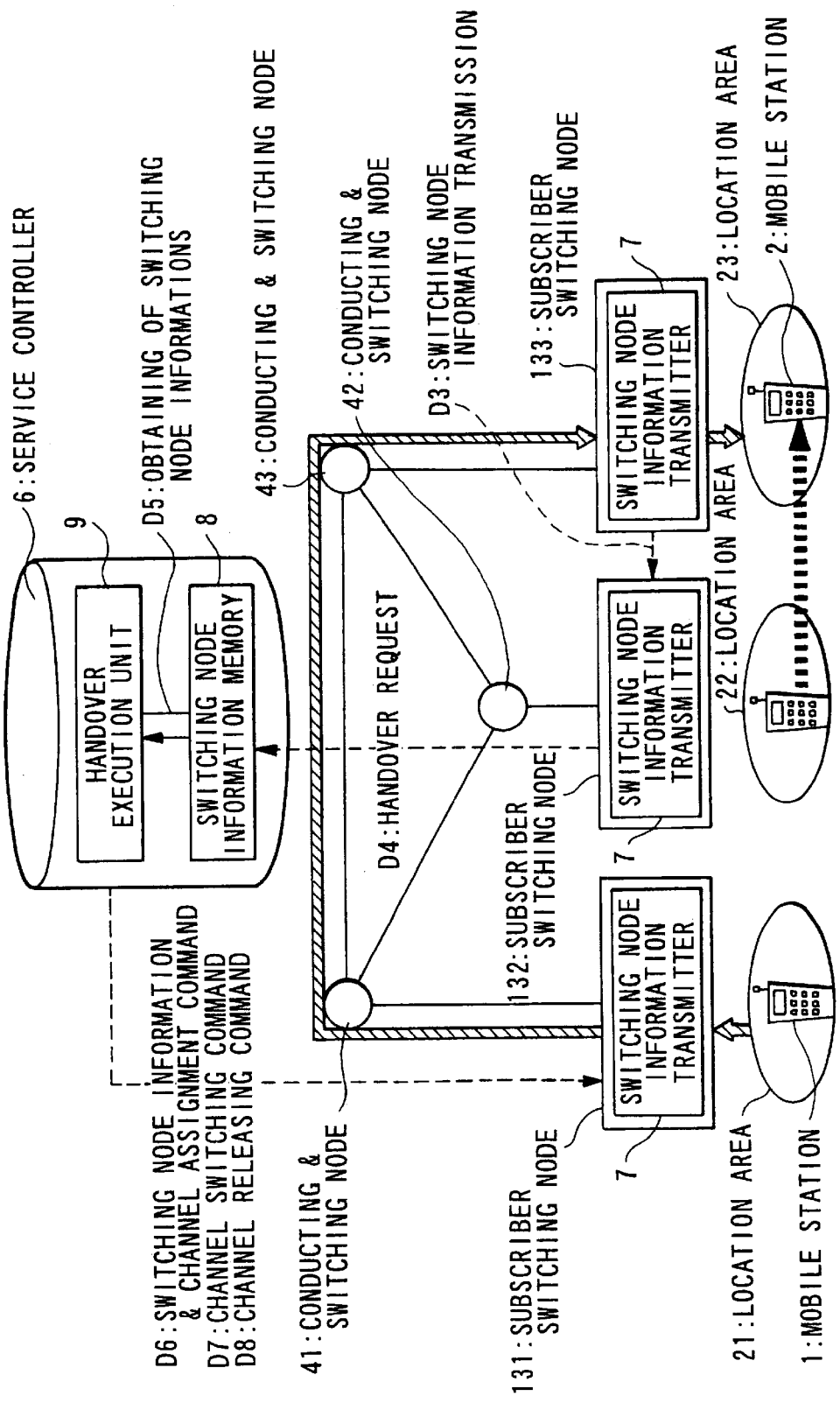
FIG. 8 shows an example of channel connection according to the second embodiment when the handover control between the mobile stations takes place.

FIG. 7 shows an example of channel connection, at the beginning of the communication, between the mobile stations 1 and 2. In the example, a channel is assigned between the mobile stations 1 and 2 as similar to the previous example, of communication between the fixed terminal and a mobile station, with the proviso that the gateway conducting & switching node substitutes the subscriber switching node. FIG. 8 shows an example of channel connection in the handover control between the mobile stations, on the assumption that the mobile station 2 roams from the location area 22 into another location area 23. In another situation, wherein the location area of the mobile station 1 is changed, the handover control can be executed in the similar process with the proviso that the mobile stations 1 and 2 are exchanged. In this situation, a channel is also assigned between the mobile stations 1 and 2 as similar to the previous example, of communication between the fixed terminal and a mobile station, with the proviso that the gateway conducting & switching node substitutes the subscriber switching node.

First, in FIG. 7, a call connection request which originates in the mobile station 1 is transferred to the subscriber switching node 131. Then, the subscriber switching node 131 transfers, to the service controller 6, a switching node information D1 representing the node 151 itself by means of the switching node information transmitter 7. Then, the service controller 6 stores the received switching node information in the switching node information memory 8.

Furthermore, when the call connection request is transferred to the subscriber switching node 132 via the conducting & switching nodes 41 and 42, the subscriber switching node 132 transfers, to the service controller 6, a switching node information D2 representing the node 132 itself by means of the switching node information transmitter 7. Then, the service controller 6 stores the received switching node information into the switching node information memory 8. Then, a channel between the mobile stations 1 and 2 is assigned by means of conventional processes. As described above, accompanied with beginning of the communication, a combination, of switching node informations of the subscriber switching nodes 131 & 132 on the channel assigned between the mobile stations 1 and 2, is stored in the switching node information memory 8.

Then, in FIG. 8, when the mobile station 2 roams from the location area 22 to another location area 23, a handover request is transferred from the mobile station 2 to the subscriber switching node 132. As a result, the subscriber switching node 132 determines the location area 23 which is the roaming destination and a subscriber switching node 133 for controlling the location area 23 by means of conventional processes, and obtains a switching node information D3 of the node 133.

Then, the subscriber switching node 132 transmits, to the service controller 6 by means of the switching node information transmitter 7, the handover request including switching node informations D4 of the node 132 itself and of the subscriber switching node 133 which is the switching destination.

The handover request is transferred to the handover execution unit 9 in the service controller 6. Then, the handover execution unit 9 searches, the combination including the switching node information (the switching node information concerning the subscriber switching node 132 in this example) which is representing the node handover request originated and is included in the handover request, among the combination of switching node informations stored in the switching node information memory 8. According to the example described above, a combination D5, the combination of switching node informations of the subscriber switching nodes 131 and 132, is obtained as a searching result.

Then, the service controller 6 transmits, to the subscriber switching node 131 the combination obtained by the searching, a channel assignment command D6. The command D6 makes, the subscriber switching node 133 which is the switching destination in the handover request, into the connection destination. Furthermore, the service controller 6 stores a combined information, consisting of switching node information of the subscriber switching node 133 in the switching destination and the subscriber switching node 131, as a revised information concerning the call by means of the switching node information memory 8.

Then, the subscriber switching node 131 having received the command for channel assignment executes, by means of conventional routing technique, a channel assignment on the basis of the switching node information included in the command for channel assignment. Then, the node 131 executes channel assignment toward the subscriber switching node 133 of the handover destination. According to the channel assignment described above, an optimum route channel connecting the switching nodes 131, 41, 43, and 133 is assigned between the subscriber switching nodes 131 and 133. When the new channel assignment is completed, the handover execution unit 9 transmits, to the subscriber switching node 131, a command D7 for switching from the previous channel assigned at the beginning of the communication into the channel newly assigned, and another command D8 for releasing the previous channel. As a result, the subscriber switching node 131 executes a changeover into the newly assigned channel and releasing of the previous channel.

As described heretofore, according to the second embodiment, if the handover is to be executed when the mobile stations communicate with each other in a common mobile communication network, since the subscriber switching node, the node controlling the mobile station which is not requesting the handover, executes routing originated from the node itself and channel assignment, the channel assigned accompany with the optimum route in the mobile communication network.

The handover control for communication between the fixed terminal and the mobile station, and that between the mobile stations in a common mobile communication network are described in separate embodiments; however, it will be appreciated that the present invention is not restricted by the embodiments described above. That is, by providing all the components described in the first and second embodiments, a unified mobile communication system can be composed which executes the handover control described in the first embodiment when the fixed terminal communicates with the mobile station, and which executes the handover control described in the second embodiment when the mobile stations communicate with each other.

We claim:

1. A mobile communication system comprising:
   a first node for controlling a first location area in which a mobile station can be located;
   a second node for controlling a second location area in which the mobile station can be located;
   a third node;
   a plurality of conducting & switching nodes for conducting the first, second and third nodes;
   a handover controller for changing a condition of a communication route assigned to the mobile station if the mobile station roams between the first and second location areas;
   a first switching node information transmitter for transmitting, when the third node and the mobile station communicate with each other via the first node, a first switching node information representing the first node;
   a second switching node information transmitter for transmitting, when the third node and the mobile station communicate with each other via the second node, a second switching node information representing the second node;
   a switching node information memory for storing either of said switching node information supplied thereto; and
   a handover execution unit for commanding said plurality of conducting & switching nodes, on the basis of the switching node information stored in the switching node information memory, a handover so as to assign a route which connects the third node with either of the first or the second nodes and not connecting the first and second nodes with one another;
   whereby a route which connects the second node and the third node and which does not pass through the first node is assigned.

2. The mobile communication system according to claim 1, wherein the third node is a gateway conducting & switching node.

3. The mobile communication system according to claim 1, wherein the third node controls a third location area in which the mobile station can be located.

4. A method for handover in a mobile communication system which includes:
   a first node for controlling a first location area in which a mobile station can be located;
   a second node for controlling a second location area in which the mobile station can be located;
   a third node;
   a conducting & switching network for conducting the first, second and third nodes, said conducting & switching network including a fourth node, a fifth node, a first channel connecting said first and fourth nodes, a second channel for connecting said fifth and second nodes, a third channel for connecting said third and fourth nodes without passing through said fifth node, a fourth channel for connecting said fourth and fifth nodes without passing through said third node, and a fifth channel for connecting said third and fifth nodes without passing through said fourth node; and
   a handover controller for changing, in said conducting & switching network, a condition of a communication route assigned to the mobile station if the mobile station roams between the first and second location areas;
   said handover method comprising the steps of:
      locating the mobile station in the first location area;
      assigning a first route, between the mobile station and the third node, wherein the first route passes through the first node and does not pass through the second node;
      roaming, of the mobile station, into the second location area;
      transmitting a switching node information representing the second node;
      storing the switching node information in the switching node information memory;
      assigning, on the basis of the switching node information stored in the switching node information memory, a second route, between the mobile station and the third node, which passes through the second node and does not pass through the first node; and
      releasing the first route.

5. The method according to claim 4, wherein the third node is a gateway conducting & switching node.

6. The method according to claim 4, wherein the third node controls a third location area in which the mobile station can be located.

7. A method for handover according to claim 4, wherein said first route passes through one or more channels among said third, fourth, and fifth channels, and passes through said first channel and not with said second channel, and said second route passes through one or more channels among said third, fourth, and fifth channels, and passes through said second channel and not with said first channel, if said route is assigned between said third node and said mobile station roams from said first location area into said second location area.

8. A mobile communication system comprising:
   a plurality of subscriber switching nodes, including first and second subscriber switching nodes, for controlling location areas of a mobile station;
   a third node, which is a gateway conducting & switching node connected with an external network;
   a conducting & switching network for conducting the first to third nodes, said conducting & switching network including a fourth node, a fifth node, a first channel connecting said first and fourth nodes, a second channel for connecting said fifth and second nodes, a third channel for connecting said third and fourth nodes without passing through said fifth node, a fourth channel for connecting said fourth and fifth nodes without passing through said third node, and a fifth channel for connecting said third and fifth nodes without passing through said fourth node; and a handover controller for changing, in said conducting & switching network, a condition of a communication route assigned for the mobile station if the mobile station roams from a current location area to another location area;

wherein the mobile communication network includes a service controller having a switching node information memory and a handover execution unit;

the subscriber switching node and the gateway conducting & switching node are provided with switching node information transmitters, respectively, for transmitting to the service controller switching node informations representing the nodes themselves;

if a communication is to be executed between the external network and the mobile station, the gateway conducting & switching node and the subscriber switching node, which comprise the communication route utilized for communication, transmit to the service controller the switching node informations by means of the switching node information transmitters provided therein;

the service controller stores the switching node information into the switching node information memory; and if a handover control is required due to roaming of the mobile station from the current location area to the another location area, the handover execution unit in the service controller specifies, on the basis of switching node informations stored in the switching node information memory, the gateway conducting & switching node comprising the communication route, and the handover execution unit causes the conducting & switching network to assign a route connecting the gateway conducting & switching node and the subscriber switching node controlling the external location area.

9. A mobile communication system according to claim 8, wherein said handover control means assign a route passing through one or more channels among said third, fourth, and fifth channels, and passing through said first channel and not with said second channel, if said route is assigned between said third node and said mobile station which is visiting in said first location area, while said handover control means assign another route passing through one or more channels among said third, fourth, and fifth channels, and passing through said second channel and not with said first channel, if said mobile station roams from said first location area into said second location area.

10. In a mobile communication system comprising a mobile communication network which includes:

a plurality of subscriber switching nodes for controlling location areas of a mobile station, said subscriber switching nodes including first and second nodes which control first and second location areas, respectively;

a third node;

a conducting & switching network for conducting the first, second and third nodes, said conducting & switching network including a fourth node, a fifth node, a first channel connecting said first and fourth nodes, a second channel for connecting said fifth and second nodes, a third channel for connecting said third and fourth nodes without passing through said fifth nodes, a fourth channel for connecting said fourth and fifth nodes without passing through said third node, and a fifth channel for connecting said third and fifth nodes without passing through said fourth node; and a handover controller for changing a condition of a communication route assigned for the mobile station in said conducting & switching network if the mobile station roams from a current location area to another location area;

the mobile communication network includes a service controller having a switching node information memory and a handover execution unit;

the subscriber switching nodes are provided with switching node information transmitters, respectively, for transmitting, to the service controller, switching node informations representing the nodes themselves;

if a communication is to be executed between two mobile stations, the subscriber switching nodes, which comprise the communication route utilized for communication in said conducting & switching network, transmits to the service controller the switching node informations by means of the switching node information transmitters provided therein;

the service controller stores the switching node informations in the switching node information memory; and if a handover control is required due to roaming of either mobile stations from the current location area to the another location area, the handover execution unit in the service controller specifies, on the basis of switching node information stored in the switching node information memory, the subscriber switching node controlling the location area of another mobile station, among the subscriber switching nodes comprising the communication route, and the handover execution unit causes the specified subscriber switching node to assign a route in said conducting & switching network, said route connecting the specified subscriber switching node and the other subscriber switching node controlling the location area of the other mobile station.

11. A mobile communication system according to claim 10, wherein said handover control means assign a route passing through one or more channels among said third, fourth, and fifth channels, and passing through said first channel and not with said second channel, if said route is assigned between said third node and said mobile station which is visiting in said first location area, while said handover control means assign another route passing through one or more channels among said third, fourth, and fifth channels, and passing through said second channel and not with said first channel, if said mobile station roams from said first location area into said second location area.

12. A mobile communication system comprising:

a mobile communication network including subscriber switching nodes for controlling location areas of a mobile station, said subscriber switching nodes including first and second subscriber switching nodes which control first and second location areas, respectively, a third node which is a gateway conducting & switching node connected with an external network, fourth and fifth nodes which are conducting & switching nodes for conducting the switching nodes, a first channel connecting said first and fourth nodes, a second channel for connecting said fifth and second nodes, a third channel for connecting said third and fourth nodes without passing through said fifth node, a fourth channel for connecting said fourth and fifth nodes without passing through said third node, and a fifth channel for connecting said third and fifth nodes without passing through said fourth node;

a handover control means for changing a condition of a communication channel assigned to the mobile station by changing condition of said third, fourth or fifth channel, if the mobile station roams from a current location area to another location area;

the mobile communication network includes a service controller having a switching node information memory and a handover execution unit;

the subscriber switching node and the gateway conducting & switching node are provided with switching node information transmitters, respectively, for transmitting to the service controller switching node informations representing the nodes themselves;

if a communication is to be executed between the external network and one of the mobile stations, the gateway conducting & switching node and the subscriber switching node, which comprise the communication channel utilized for communication, transmits to the service controller the switching node informations by means of the switching node information transmitters provided therein;

the service controller stores the switching node information in the switching node information memory; and if a handover control is required due to roaming of the mobile station from the current location area to the other location area, the handover execution unit in the service controller specifies, on the basis of switching node informations stored in the switching node information memory, the gateway conducting & switching node comprising the communication channel, and the handover execution unit causes the gateway conducting & switching node to assign a channel connecting the gateway conducting & switching node and the subscriber switching node controlling the external location area; and if the communication is to be executed between two mobile stations in the mobile communication network, the subscriber switching nodes utilized for the communication transmit, by means of the switching node information transmitters provided therein, the switching node informations to the service controller, respectively;

the service controller stores the switching node information into the switching node information memory; and if a handover control is required due to roaming of either of the mobile stations from the current location area to the another location area, the handover execution unit in the service controller specifies, on the basis of switching node informations stored in the switching node information memory, the subscriber switching node controlling the location area of another mobile station, among the subscriber switching nodes comprising the communication channel, and the handover execution unit causes the specified subscriber switching node to assign a channel connecting the specified subscriber switching node and the other subscriber switching node controlling the location area of the other mobile station.

13. A mobile communication system according to claim 12, wherein said handover control means assign a route passing through one or more channels among said third, fourth, and fifth channels, and passing through said first channel and not with said second channel, if said route is assigned between said third node and said mobile station which is visiting in said current location area, while said handover control means assign another route passing through one or more channels among said third, fourth, and fifth channels, and passing through said second channel and not with said first channel, if said mobile station roams from said current location area into said another location area.

14. A mobile communication system comprising:

a first node for controlling a first location area in which a mobile station can be located;

a second node for controlling a second location area in which the mobile station can be located;

a third node;

a conducting & switching network for conducting the first to third nodes, said conducting & switching network including a fourth node, a fifth node, a first channel connecting said first and fourth nodes, a second channel for connecting said fifth and second nodes, a third channel for connecting said third and fourth nodes without passing through said fifth nodes, a fourth channel for connecting said fourth and fifth nodes without passing through said third node, and fifth channel for connecting said third and fifth nodes without passing through said fourth node; and a handover controller for changing, in said conducting & switching network, a condition of a communication route assigned to the mobile station if the mobile station roams between the first and second location areas;

a first switching node information transmitter for transmitting, when the third node and the mobile station communicate with each other via the first node, a first switching node information representing the first node;

a second switching node information transmitter for transmitting, when the third node and the mobile station communicate with each other via the second node, a second switching node information representing the second node;

a switching node information memory for storing either of said switching node information supplied thereto; and a handover execution unit for commanding to said conducting & switching network, on the basis of the switching node information stored in the switching node information memory, a handover so as to assign a route which connects the third node with either of the first or the second nodes and not connecting the first and second nodes with one another;

whereby a route which connects the second node and the third node and which does not pass the first node is assigned.

15. A mobile communication system according to claim 14, wherein said route passes through one or more channels among said third, fourth, and fifth channels, and passes through either one of said first or second channels and not with one another, if said route is assigned between said third node and either one of said first or second channels.

* * * * *